(12) United States Patent
Huang

(10) Patent No.: US 10,982,777 B2
(45) Date of Patent: Apr. 20, 2021

(54) SWITCHING STRUCTURE OF WATER DISPENSING APPARATUS

(71) Applicant: YUAN-MEI CORP., Changhua County (TW)

(72) Inventor: Po-Chao Huang, Changhua County (TW)

(73) Assignee: YUAN-MEI CORP., Changhua County (TW)

( * ) Notice: Subject to any disclaimer, the term of this patent is extended or adjusted under 35 U.S.C. 154(b) by 0 days.

(21) Appl. No.: 15/001,177

(22) Filed: Jan. 19, 2016

(65) Prior Publication Data
US 2017/0204978 A1    Jul. 20, 2017

(51) Int. Cl.
| | |
|---|---|
| *F16K 5/04* | (2006.01) |
| *B05B 1/30* | (2006.01) |
| *B05B 1/16* | (2006.01) |
| *B05B 9/01* | (2006.01) |

(52) U.S. Cl.
CPC .......... *F16K 5/0407* (2013.01); *B05B 1/1636* (2013.01); *B05B 1/3026* (2013.01); *B05B 9/01* (2013.01); *F16K 5/0478* (2013.01); *F16K 5/0485* (2013.01)

(58) Field of Classification Search
CPC .......... B05B 1/30; B05B 1/3026; B05B 9/01; B05B 12/002; B05B 1/1636; B05B 1/02; B05B 1/06; F15K 5/0407; F15K 5/0414; F15K 5/0478; F16K 5/0442; F16K 5/0464; F16K 5/0471; F16K 27/065; F16K 31/602; F16K 5/0478; F16K 5/0485; F16K 5/0407; F16K 5/188; F16K 5/0414
See application file for complete search history.

(56) References Cited

U.S. PATENT DOCUMENTS

| | | | | |
|---|---|---|---|---|
| 2,753,219 | A * | 7/1956 | Matarese | A62C 31/005 239/456 |
| 3,133,723 | A * | 5/1964 | Goldman | F16K 5/0478 251/309 |
| 3,991,975 | A * | 11/1976 | Sibrava | F16K 5/0478 251/309 |
| 5,037,067 | A * | 8/1991 | Ray | F16K 5/0478 251/314 |
| 5,234,193 | A * | 8/1993 | Neal, Jr. | F16K 27/065 251/175 |

(Continued)

FOREIGN PATENT DOCUMENTS

| | | | | |
|---|---|---|---|---|
| FR | 2809466 A1 * | 11/2001 | | F16K 5/184 |
| FR | 2889464 B3 * | 6/2007 | | B05B 1/3013 |

(Continued)

*Primary Examiner* — Hailey K. Do
(74) *Attorney, Agent, or Firm* — Raymond Y. Chan; David and Raymond Patent Firm

(57) ABSTRACT

A water dispensing apparatus includes a main body having an inlet channel, an outlet channel and a throughpath provided therebetween, a pivot valve mounted pivotally through the throughpath, which includes a water sealing portion and a water passing portion opposite to each other, and a first sheltering member and a second sheltering member coupled respectively at two sides of the main body, and an actuation member extended operatively between the first sheltering member and the second sheltering member of the pivot valve.

3 Claims, 9 Drawing Sheets

(56) References Cited

U.S. PATENT DOCUMENTS

| | | | | |
|---|---|---|---|---|
| 5,531,247 A | * | 7/1996 | Borst | F16K 5/0407 |
| | | | | 137/447 |
| 7,240,858 B2 | * | 7/2007 | Wang | B05B 1/3013 |
| | | | | 239/526 |
| 8,596,558 B2 | * | 12/2013 | Lai | B05B 9/01 |
| | | | | 239/525 |

FOREIGN PATENT DOCUMENTS

| | | | | | |
|---|---|---|---|---|---|
| GB | 534610 A | * | 3/1941 | | F16K 5/0478 |
| GB | 534610 A | * | 3/1941 | | F16K 5/0478 |
| GB | 2093165 A | * | 8/1982 | | F16K 5/0478 |

\* cited by examiner

SWITCHING STRUCTURE OF WATER DISPENSING APPARATUS

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a water dispensing apparatus, specifically to a water dispensing apparatus with a switching structure, wherein a switching valve is set between water channels of the water dispensing apparatus and is actuated by a manual actuation member to enable to a manual operation of the manual actuation member to control the switch valve.

Description of Related Arts

Conventional water dispensing apparatuses usually have a valve to control to turn on and off the watering for the users to easily operate the valve and, therefore, have actuation members for manual pushing. These structures of water dispensing apparatus include the following. A main body has an outlet channel and an inlet channel. The outlet channel and the inlet channel connect the water flow with a through channel as a bridging channel. The through channel is pivotingly assembled with a pivot valve, wherein the pivot valve has a water sealing portion and the pivot valve is mounted through the through channel. The two ends of the pivot valve assemblingly connect with an actuation member to allow the radial angle of the pivoting of the pivot valve to be driven by operating the actuation member, which makes the water sealing portion to close the outlet opening or open the inlet channel.

The opening of the outlet channel belongs to a round bore type. Such round bore type of outlet opening is a common structure for several conventional water dispensing apparatuses. Because of such design of round bore type and the water sealing portion matching the outlet opening, the back of the water sealing portion is bearing both of the impact pressure of the flow entered from the inlet channel and the suction force of the water leaving the outlet opening. As a result, the water sealing portion bears two traction forces, which could cause the water sealing portion to be flushed out of the outlet opening or cause the water sealing portion to be distorted and fail to completely close the outlet channel, which causes leakage. Moreover, it requires a longer operation stroke to have the water sealing portion to close the outlet opening Improvements of the present invention include to make the actuation member to bring the pivoting of the pivot valve for leading the water sealing portion to close or open the inlet opening, so as to achieve the objective of shortening the stroke of the actuation member, which allows the users to use a more efficient and easy way to turn on or off the water dispensing apparatus. Besides, another objective is that the periphery of the water sealing portion has a groove, wherein the groove sleevedly has a sealing element. When the sealing element is put in the groove, there still is a minor gap left to guide water flow to enter the groove and to flush back to expand the sealing element, which make the sealing element to attach to the inlet opening more closely, which achieve the objective of preventing leakage by having the sealing element close the inlet opening more securely.

SUMMARY OF THE PRESENT INVENTION

A switching structure of water dispensing apparatus has an inlet channel and an outlet channel in a main body of the water dispensing apparatus. The inlet channel and the outlet channel has a throughpath therebetween. The throughpath is pivotingly assembled with a pivot valve. The pivot valve is mounted through the throughpath. Two ends of the pivot valve is operatively connect to an actuation member, wherein the actuation member is arranged to pivotally move the pivot valve so as to adjust the radial angle of the pivot valve and to therefore control the outlet opening and the inlet opening between an open state and a close state.

The feature is in that: the shape of the inlet opening has a bore type with a transverse width larger than a longitudinal width thereof, which shape includes oblong oval shape. The pivot valve has a water sealing portion and a water passing portion. The shape of the water sealing portion of the pivot valve matches with the bore type of the inlet opening. The water sealing portion surroundingly has a sealing element. Two sealing rings are coupled at the first and second lateral sides of the pivot valve respectively for sealing the throughpath, so as to prevent the water being leaked from the throughpath. The actuation member is extended between two side ends of the pivot valve and is located out of the main body to drive the pivot valve for controllably adjust a pivot angle of the pivot valve so as to control the water sealing portion of the pivot valve to be misaligned or aligned with the inlet opening for the pivot valve to switch between the open state and the closed state. Accordingly, when the water sealing portion is misaligned with the inlet opening, the pivot valve is opened to guide water to pass through the outlet channel, which turns the water dispensing apparatus into the open state. When the water sealing portion is aligned with the inlet opening, the pivot valve is closed to block the water at the inlet channel, which turns the water dispensing apparatus into the closed state.

The features of the present invention that solves the problems include that the inlet opening is prolate shape, which called prolate shape includes an elliptical shape or oval shape that mainly means that the transverse width of the inlet opening is larger than the longitudinal width thereof. The shape of the water sealing portion of the pivot valve matches with the shape of the inlet opening. Outer periphery of the water sealing portion further has a groove and the groove has a sealing element. The sleeving between the sealing element 25 and the groove 241 still leaves a minor gap.

Besides, when the water sealing portion of the pivot valve and the inlet opening are coupled for close mode, it just has the sealing element align with the inlet opening, which makes the water sealing portion to directly bear the impact of water pressure from the inlet opening in the front. When the water sealing portion close the inlet opening, the water sealing portion bears water flow flushed from the inlet channel. The water flow also flushes into the groove of the periphery of the water sealing portion. The water that entered the groove flush back to the sealing element so as to slightly expand the sealing element with the water that flushed back. As a result, the sealing element attaches to the outer periphery of the inlet opening more closely, which makes the effect of preventing leakage by closing the inlet opening more securely.

Another feature of the present invention is that the inlet opening applies an improved design of a prolated opening. Because the longitudinal width of the shape of the opening is shortened, stroke for the pivot valve to actuate between opening and closing can be shortened. Besides, because the transverse width of the shape of the opening becomes longer, it provide more volume of water flow at the inlet opening.

The present invention can achieve the objectives of leakproof and shortening the path for switching operation by making the shape of the inlet opening prolated only.

These and other objectives, features, and advantages of the present invention will become apparent from the following detailed description, the accompanying drawings, and the appended claims.

DETAILED DESCRIPTION OF THE PREFERRED EMBODIMENT

Figure 1:
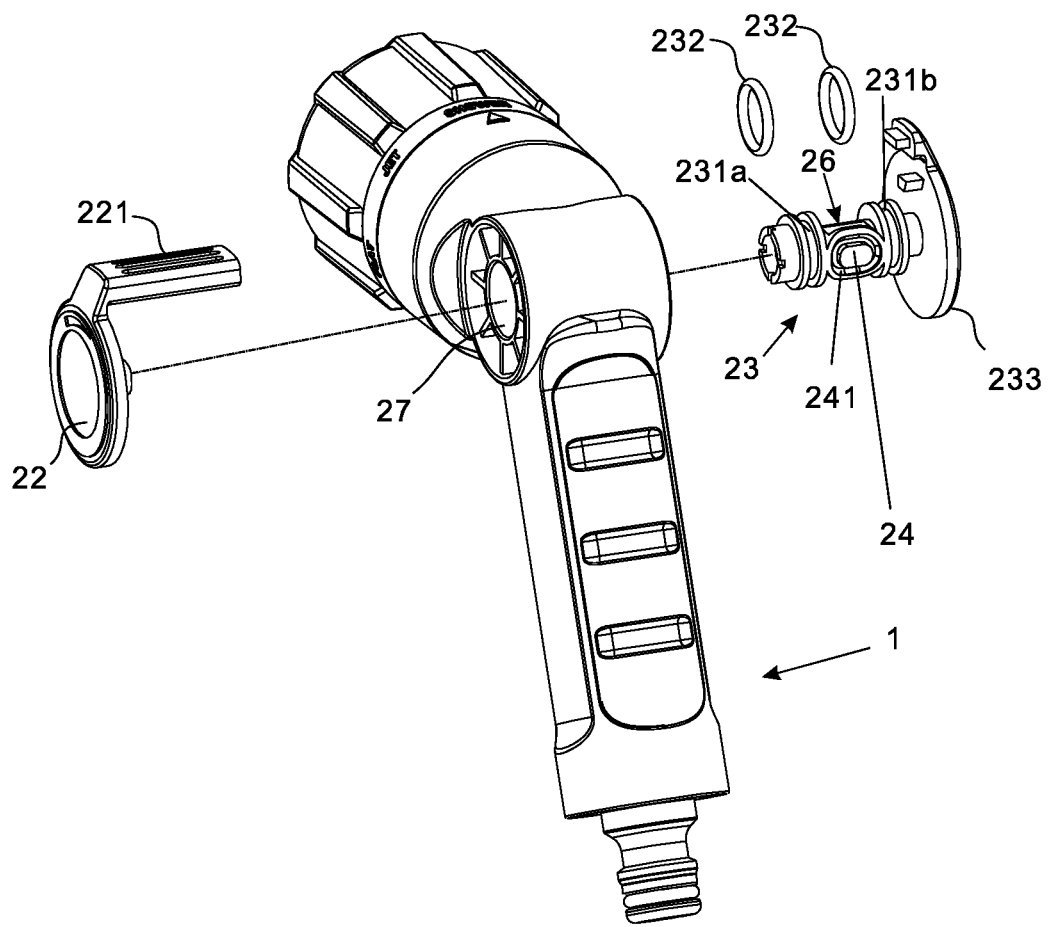
FIG. 1: an exploded three-dimensional perspective view of the present invention.
Figure 2:
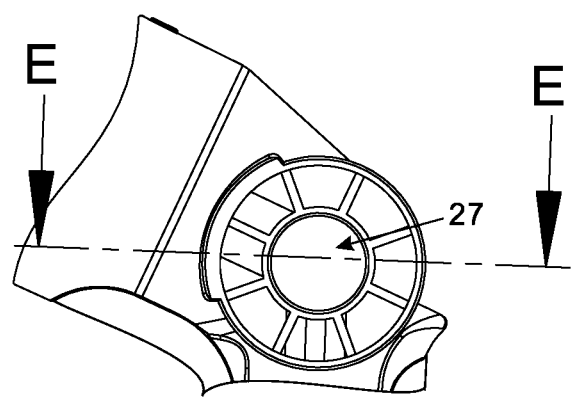
FIG. 2: an enlarged perspective view of a through channel of a water dispensing apparatus of the present invention.

In order for well understanding of the present invention, the following will provide preferred embodiments and corresponding figures for detail descriptions. Corresponding figures of the preferred embodiments of the present invention will also be applied for further illustration, so as to help those who skill in the art to implement the present invention based on the present specification, which however shall not be used to limit the scope of the present invention.

Referring to FIGS. 1 to 7 of the drawings, the main body 1 of the water dispensing apparatus has an inlet channel 11 and an outlet channel 12. The inlet channel 11 and the outlet channel 12 have a throughpath 27 therebetween. The throughpath 27 has an inlet opening 271 formed by the inlet channel 11 and an outlet opening 272 formed by the outlet channel 12. The throughpath 27 is pivotingly assembled with a pivot valve 23, wherein the pivot valve 23, which has a column shape, is longitudinally extended through the throughpath 27 of the main body 1 of the water dispensing apparatus. The pivot valve 23 is mounted at the throughpath 27 in a pivotally movable manner, wherein the pivot valve 23 is operatively connect to an actuation member 221, wherein the actuation member 221 is arranged to pivotally move the pivot valve 23 so as to adjust the radial angle of the pivot valve 23 and to therefore controllably open and close the inlet opening 271.

Figure 3:
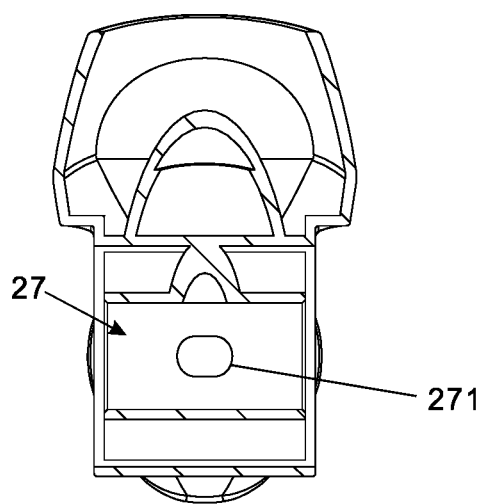
FIG. 3: an E-E sectional perspective view of FIG. 2.
Figure 4:
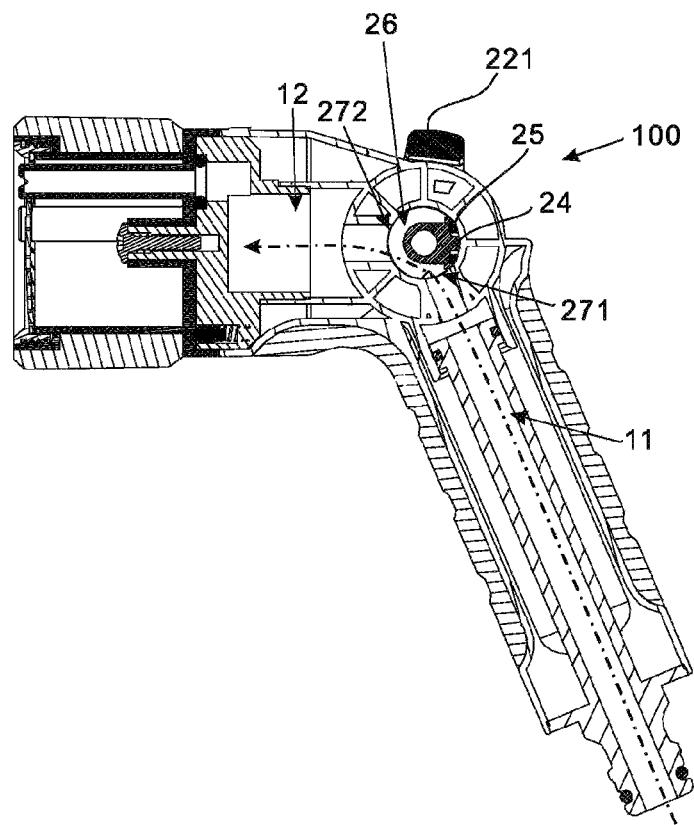
FIG. 4: a sectional implementation perspective view of opening an inlet channel of the present invention.

As shown in FIGS. 3 and 4, the inlet opening 271 has a prolate shape or non-circular shape that a transverse width of the inlet opening 271 is larger than a longitudinal width thereof. Preferably, the inlet opening 271 has an oblong oval shape. In addition, the longitudinal width of the inlet opening 271 is slightly smaller than a longitudinal width of the inlet channel 11. The water flow rate at the inlet opening 271 will be increased by increasing the transverse width of the inlet opening 271, and the stroke of the pivot valve 23 will be shortened by reducing the longitudinal width of the inlet opening 271.

The pivot valve 23 has a water sealing portion 24 and a water passing portion 26 aligned with the water sealing portion 24, wherein the water sealing portion 24 and the water passing portion 26 are formed at two opposite sides of the pivot valve 23. In particular, the pivot valve 23 has two lateral portions to form the water sealing portion 24 and the water passing portion 26 respectively. The shape of the water sealing portion 24 of the pivot valve 23 matches with the shape of the inlet opening 271. Specifically, the water sealing portion 24 has a sealing surface formed in an elongated curving configuration matching with a curvature of a wall of the inlet opening 271, wherein the sealing surface of the water sealing portion 24 is preferably formed in an oblong oval shape. The transverse width of the sealing surface of the water sealing portion 24 is larger than a longitudinal width thereof. Also, the shape of the water sealing portion 24 is the elliptic shape that fits to seal at the inlet opening 271. Accordingly, the water sealing portion 24 has a sealing area larger than the inlet opening 271, such that the area of the water sealing portion 24 is large enough to seal at the inlet opening 271. The pivot valve 23 further has a groove 241 indently formed on the sealing surface of the water sealing portion 24 at a periphery thereof and a sealing element 25 disposed at the groove 241 at the sealing surface of the water sealing portion 24.

When the water sealing portion 24 is misaligned with the inlet opening 271, the pivot valve 23 is opened to guide water to pass through the outlet channel 272, and when the water sealing portion 24 is aligned with the inlet opening 271, the pivot valve 23 is closed to block the water at the inlet channel 11. In particular, when the water sealing portion 24 of the pivot valve 23 is moved to align with the inlet opening 271 at a position that the sealing surface of the water sealing portion 24 seals at the inlet opening 271, the sealing element 25 at the periphery of the sealing surface of the water sealing portion 24 will tightly seal at a periphery of the inlet opening 271. In other words, the sealing element 25 is tightly coupled at the sealing surface of the water sealing portion 24 to provide an effective sealing effect for tightly sealing at the inlet opening 271 so as to prevent any water leakage of the inlet opening 271. The pivot valve 23 further has two lateral sides defining a first lateral side 231a and a second lateral side 231b, wherein the water sealing portion 24 is located between the first and second lateral sides 231a, 231b. The pivot valve 23 further comprises two sealing rings 232 coupled at the first and second lateral sides 231a, 231b respectively for sealing the throughpath 27, so as to prevent the water being leaked from the throughpath 27.

In addition, the shape of the water sealing portion 24 matches with the shape of the inlet opening 271.

Figure 5:
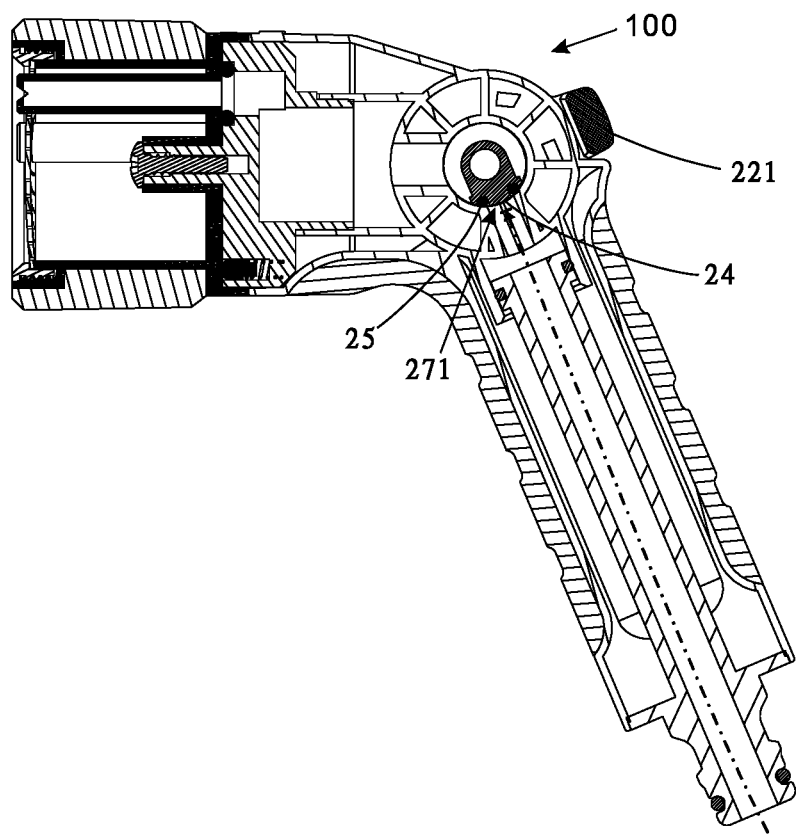
FIG. 5: a sectional implementation perspective view of closing an inlet channel of the present invention.
Figure 6:
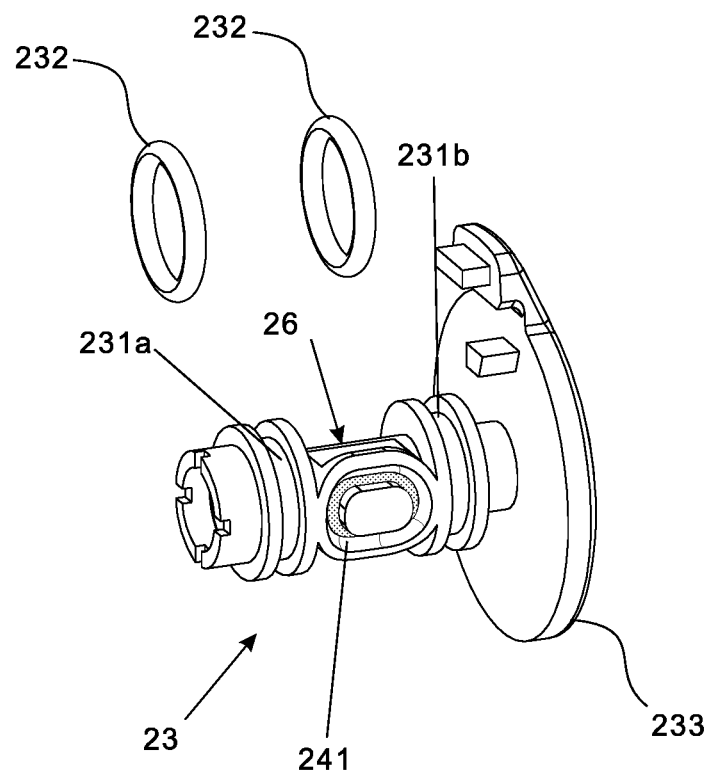
FIG. 6: an enlarged three-dimensional perspective view of a pivot valve of the present invention.
Figure 7:
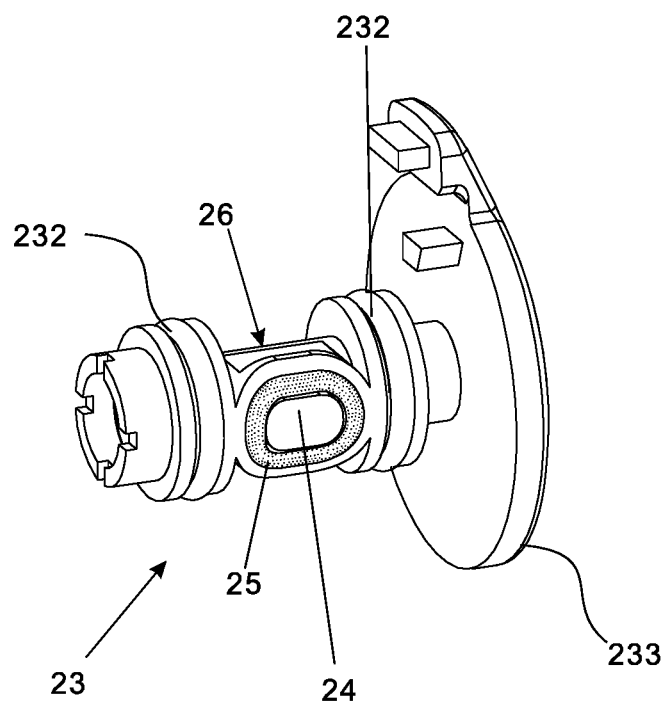
FIG. 7: an enlarged three-dimensional perspective view from another angle of a pivot valve of the present invention.

Furthermore, the pivot valve 23 further comprises a first sheltering member 233 and a second sheltering member 22, wherein the first sheltering member 233 and the second sheltering member 22 form two outer sidewalls of the pivot valve 23 and are coupled at two sides of the main body. The actuation member 221, which serves as a manual pusher, is extended between the first sheltering member 233 and the second sheltering member 22, wherein the actuation member 221 is manually driven to move by the user's finger to pivotally move the pivot valve 23 via the first sheltering member 233 and the second sheltering member 22, so as to selectively adjust the pivot angle of the pivot valve 23. In particular, the actuation member 221 is integrally extended from the second sheltering member 22 at a position that a free end of the actuation member 221 is coupled at the first sheltering member 233. In other words, the actuation member 221 is pushed forward or rearward to control the position of the water sealing portion 24 of the pivot valve 23 either to align with the inlet opening 271 or to misalign with the inlet opening 271. When the water sealing portion 24 of the pivot valve 23 is misaligned with the inlet opening 271, the water passing portion 26 of the pivot valve 23 is aligned with the outlet opening 272 for allowing the water to flow out of the outlet opening 272, i.e. the working mode of the water dispensing apparatus, as shown in FIG. 5. When the water sealing portion 24 of the pivot valve 23 is moved to align with the inlet opening 271 that the sealing surface of the water sealing portion 24 seals at the inlet opening 271, the sealing element 25 at the periphery of the sealing surface of the water sealing portion 24 will tightly seal at a periphery of the inlet opening 271 for blocking the water to enter into the throughpath 27 from the inlet opening 271, i.e. the closing mode of the water dispensing apparatus.

Figure 8:
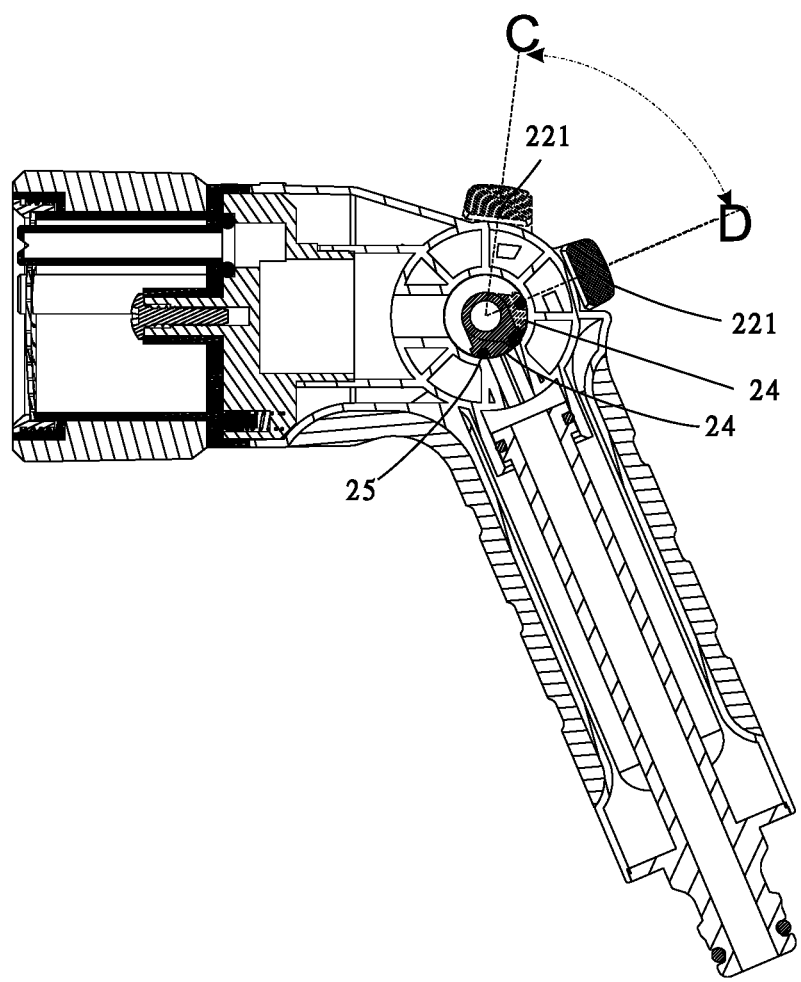
FIG. 8: a sectional implementation perspective view of the present invention.
Figure 9:
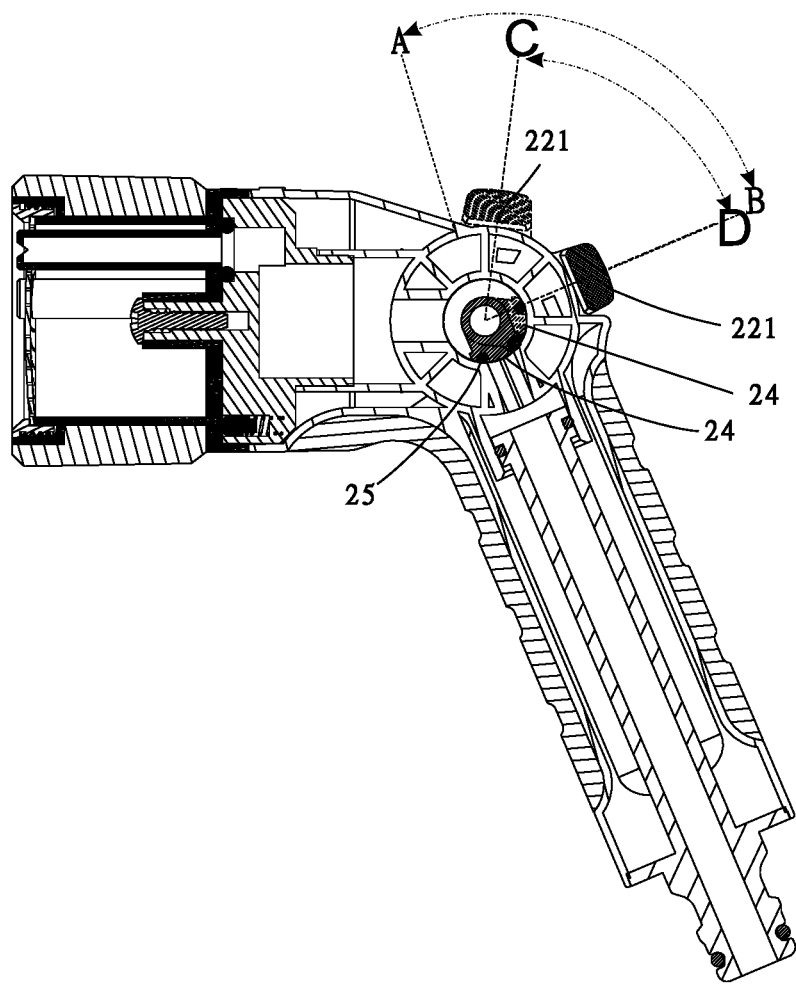
FIG. 9: a comparative perspective view for strokes of pivot valve.

As shown in FIG. 8, the actuation member 221 is moved at a position C that the water sealing portion 24 of the pivot valve 23 is aligned with the inlet opening 271. The actuation member 221 is moved at a position D that the water sealing portion 24 of the pivot valve 23 is misaligned with the inlet opening 271. As FIG. 9 shows, an actuation member 221 of prior art brings a pivot valve 23 to pivot, which stroke required from closing to opening the water is from position A to position B. However, the stroke required from closing to opening the water of the present invention is that the actuation member 221 brings the pivot valve 23 to pivot from position C to position D. Comparing the stroke of the actuation members 221 of the present invention and the conventional water dispensing apparatus, the stroke of the present invention is shorter than that of the conventional water dispensing apparatus, such that the present invention provides an ergonomic design for the user to push the actuation member 221 by the user's finger.

Major features and advantages of the present invention include the following. The water sealing portion 24 of the pivot valve 23 fits the inlet opening 271. Also, the water sealing portion 24 surroundingly has a groove 241, and the groove 241 accommodates a sealing element 25. Besides, when the sealing element 25 is put in the groove 241, the sleeving between the sealing element 25 and the groove 241 still leaves a minor gap to allow water flow to flush therefrom, so as to allow water flow to flush back to push against the sealing element 25 to have it press on the outer periphery of the inlet opening 271, which makes the sealing element 25 close the inlet opening 271 more securely.

Also, in another embodiment, a side of the water sealing portion 24 surroundingly forms a groove 241. The peripheries of the groove 241 has multiple gaps (not shown in the Figs.), wherein the gaps are surroundingly set to the groove 241. The groove 241 accommodates a sealing element 25. Therefore, when the sealing element 25 is put into the groove 241, the gaps are able to allow water flow to flush into the groove 241 therefrom, so as to have the water flow to flush back to push against the sealing element 25 to have it press toward the inlet opening 271, which makes the sealing element 25 seal the inlet opening 271 more securely.

Besides, shapes of the inlet opening 271 include rectangle and rectangle with rounded corners.

The preceding description is meant to be illustrative of preferred embodiments and should not be construed as limiting the scope of the present invention. Various modifications, which would be readily apparent to one skilled in the art, are intended to be within the scope of the present invention. Accordingly, the only limitations to the scope of the present invention are set forth in the following claims appended hereto.

What is claimed is:

1. A water dispensing apparatus, comprising:
   a main body having an inlet channel, an outlet channel and a lateral channel extended between said inlet channel and said outlet channel adapted for water flowing from said inlet channel to said outlet channel through said lateral channel, wherein said lateral channel has an inlet opening formed by said inlet channel and an outlet opening formed by said outlet channel, wherein each of said inlet opening and said outlet opening has an oblong oval shape;
   an actuation member; and
   a pivot valve, having a column shape, extended and mounted pivotally and longitudinally through said lateral channel in a movable manner,
   wherein two side ends of said pivot valve are operatively connect to said actuation member such that said actuation member is arranged to pivotally move said pivot valve to adjust a radial angle of said pivot valve and to controllably open and close said inlet opening, wherein said pivot valve comprises a water sealing portion and a water passing portion,
   wherein said water sealing portion and said water passing portion are formed at two lateral portions at two opposite sides of said pivot valve respectively, wherein said water sealing portion has an oblong oval shape matching with said inlet opening that fits to seal at said inlet opening,
   wherein said water sealing portion has a sealing surface, having an oblong oval shape, formed in an elongated curving configuration matching with a curvature of a wall around said inlet opening,
   wherein a longitudinal width of said sealing surface of said water sealing portion is larger than a transverse width of said sealing surface,
   wherein said water sealing portion has a sealing area larger than said inlet opening such that said area of said water sealing portion is large enough to seal at said inlet opening,
   wherein said pivot valve further comprises a sealing element and has a groove indently formed on said sealing surface of said water sealing portion at a periphery of said sealing surface to accommodate said sealing element being disposed at said groove at said sealing surface of said water sealing portion, wherein a gap is provided between said sealing element and said groove in such a manner that a water flow is allowed to flush therefrom so as to allow the water flow to flush back to push against said sealing element to have said sealing element pressing on a periphery of said input opening making said sealing element to securely close said inlet opening, wherein said oblong oval shaped water sealing portion enables said sealing element being tightly coupled at said sealing surface of said water sealing portion to provide an effective sealing effect to tightly seal at said inlet opening so as to prevent any water leakage of said inlet opening, wherein when said water sealing portion is misaligned with said inlet opening, said pivot valve is opened to guide a water at said inlet opening to pass through said outlet channel, and when said water sealing portion is aligned with said inlet opening, said pivot valve is closed to block the water at said inlet opening, wherein when said water sealing portion of said pivot valve is moved by rotating said actuation member to align with said inlet opening at a position that said sealing surface of said water sealing portion seals at said inlet opening, said sealing element at said periphery of said sealing surface of said water sealing portion tightly seals at said periphery of said inlet opening such that said sealing element is tightly coupled at said sealing surface of said water sealing portion to provide a sealing effect for tightly sealing at said inlet opening, wherein a pivot angle of said pivot valve is adjustable by pivotally moving said pivot valve to pivotally move while said actuation member is driven to forward or rearward so as to control a position of said water sealing portion of said pivot valve either to align with said inlet opening or to misalign with said inlet opening in such a manner that when said water sealing portion of said pivot valve is misaligned with said inlet opening, said water passing portion of said pivot valve is aligned with said outlet opening for allowing the water to flow out of said outlet opening, and that when said water sealing portion of said pivot valve is moved to align with said inlet opening that said sealing surface of said water sealing portion seals at said inlet opening, said sealing element at said periphery of said sealing surface of said water sealing portion tightly seals at said periphery of said inlet opening for blocking the water to enter into said lateral channel from said inlet opening, wherein a longitudinal width of said inlet opening is larger than a transverse width thereof, wherein said longitudinal width of said inlet opening is slightly smaller than a longitudinal width of said inlet channel, wherein a water flow rate at said inlet opening is increased by increasing said longitudinal width of said inlet opening and a stroke of said pivot valve is shortened by reducing said transverse width of said inlet opening.

2. The water dispensing apparatus, as recited in claim 1, wherein said pivot valve has a first lateral side and a second lateral side, and that said water sealing portion is positioned between said first and second lateral sides, wherein said pivot valve comprises two sealing rings coupled at said first and second lateral sides respectively for sealing said lateral channel.

3. The water dispensing apparatus, as recited in claim 2, wherein said pivot valve comprises a first sheltering member and said actuation member comprises a second sheltering member, wherein said first sheltering member and said second sheltering member form two outer sidewalls of said pivot valve and are coupled at two sides of said main body, wherein said actuation member serves as a manual pusher extended between said first sheltering member and said second shelter member such that said actuation member is able to be driven to move to pivotally move said pivot valve via said first sheltering member and said second sheltering member so as to selectively adjust said pivot angle of said pivot valve, wherein said actuation member is able to be selectively moved from a first position that said water sealing portion of said pivot valve is aligned with said inlet opening to a second position that said water sealing portion of said pivot valve misaligned with said inlet opening, wherein said first position and said second position has an included angle smaller than 90 degrees.

* * * * *